Oct. 11, 1938.  T. R. HARRISON ET AL  2,132,617
MEASURING INSTRUMENT
Original Filed June 23, 1931  3 Sheets-Sheet 1
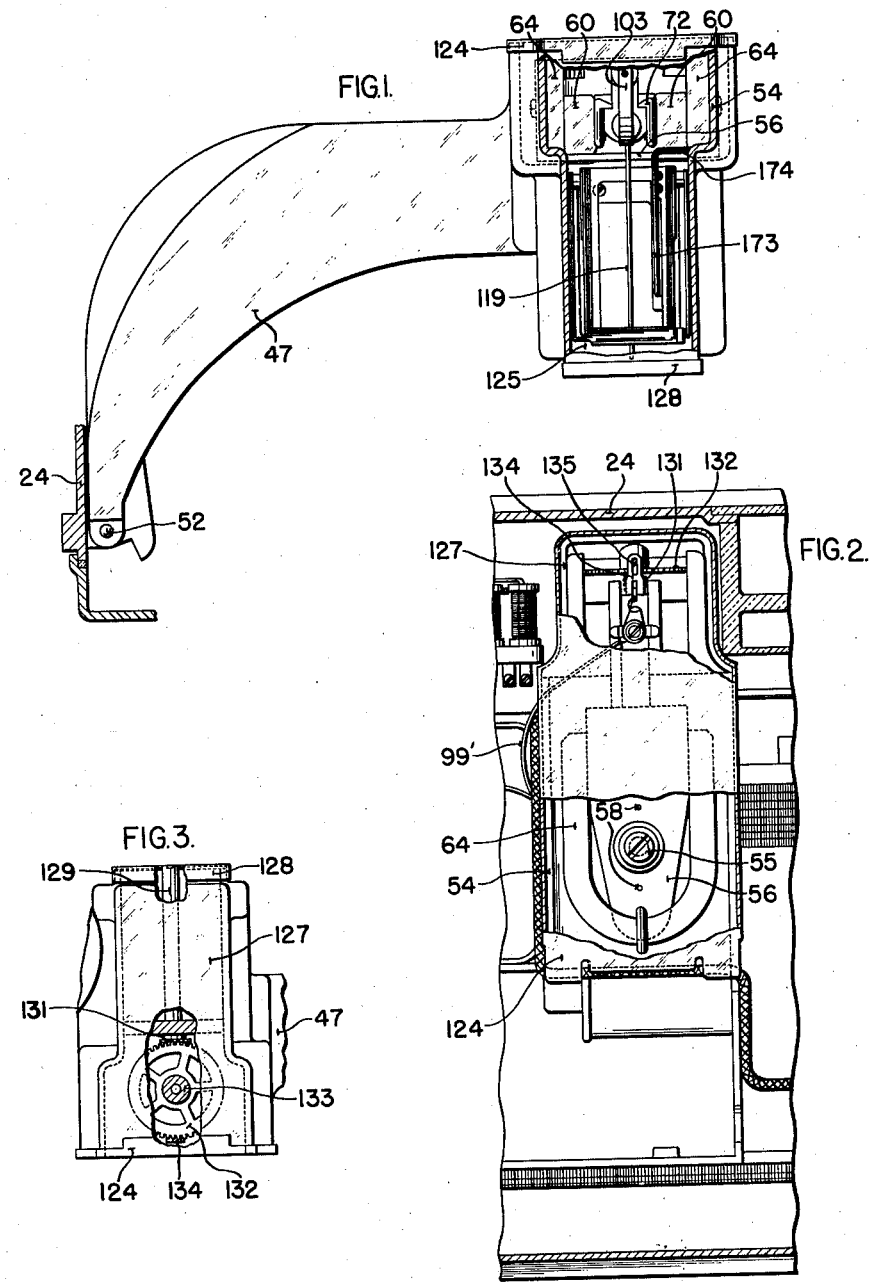
INVENTOR.
THOMAS R. HARRISON,
ERNEST H. GRAUEL,
& JOHN E. KESSLER
BY George M. Musselman
ATTORNEY

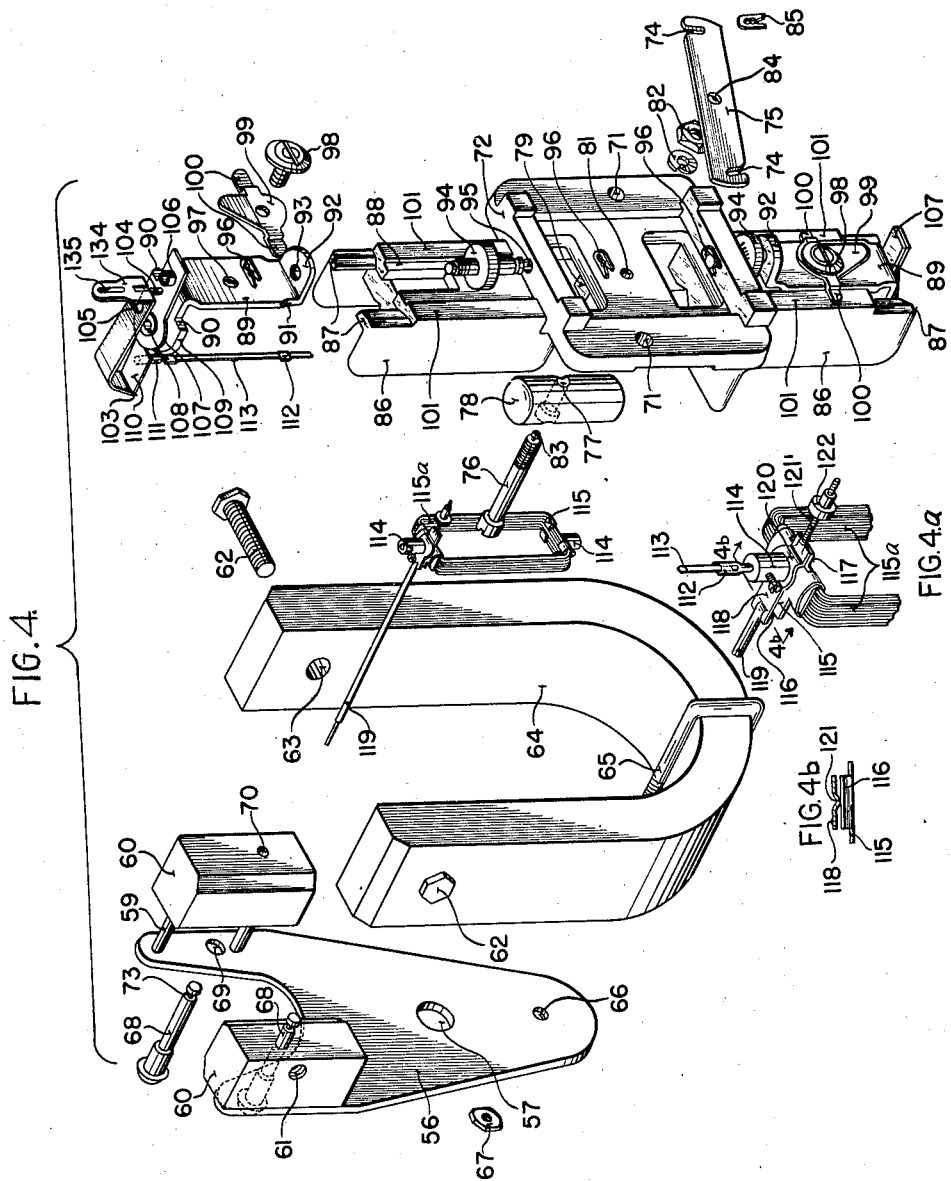

Oct. 11, 1938.　　T. R. HARRISON ET AL　　2,132,617
MEASURING INSTRUMENT
Original Filed June 23, 1931　　3 Sheets-Sheet 3
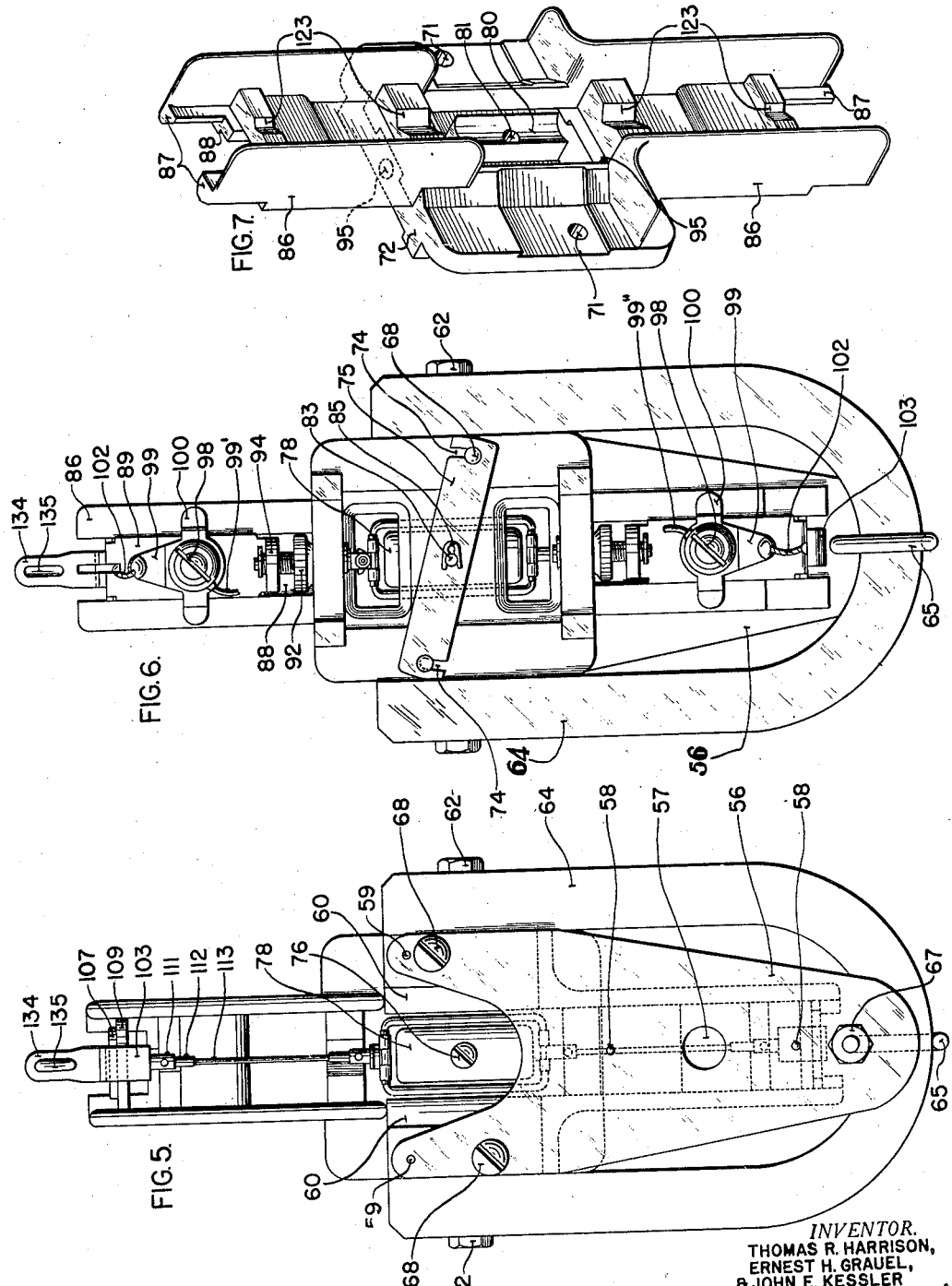
INVENTOR.
THOMAS R. HARRISON,
ERNEST H. GRAUEL,
& JOHN E. KESSLER
BY George M. Muschamp
ATTORNEY Patented Oct. 11, 1938

2,132,617

UNITED STATES PATENT OFFICE 2,132,617

MEASURING INSTRUMENT

Thomas R. Harrison, Wyncote, Ernest H. Grauel, Perkasie, and John E. Kessler, Gettysburg, Pa., assignors to The Brown Instrument Company, Philadelphia, Pa., a corporation of Pennsylvania Original application June 23, 1931, Serial No. 546,290. Divided and this application November 4, 1936, Serial No. 109,124

4 Claims. (Cl. 171—95)

The general object of the present invention is to provide improvements in galvanometer construction, to the ends of simplifying and reducing cost of manufacture, and of providing a desirably simple and effective galvanometer assembly, having a maximum accessibility for adjustment and servicing operations and a minimum of structural features subject to failure in operation.

While a galvanometer embodying our improvements is adapted for use with advantage in various relations and for various purposes, it may be used with a special advantage in a potentiometer measuring instrument which, because of its operating characteristics and the relatively large number of operating parts which it comprises, is relatively bulky, and imposes special spatial restrictions on the form and disposition of the galvanometer included in the instrument, and makes it especially important that the galvanometer should be constructed and arranged so that its relatively delicate parts may be readily separated from the remainder of the instrument, when necessary for repair, adjustment, or replacement operations.

Special objects and advantages of the invention are made apparent in the following detailed description of an embodiment of the invention illustrated in the accompanying drawings, of which:

Fig. 1 is a sectional plan, with parts broken away and removed, of a portion of a potentiometer instrument including a galvanometer constructed in accordance with the present invention;

Fig. 2 is a front elevation, with parts broken away and in section, of a portion of the instrument shown in Fig. 1;

Fig. 3 is a plan view of the galvanometer enclosure partly broken away and in section to illustrate the galvanometer zero adjustment mechanism;

Fig. 4 is a perspective view of the galvanometer assembly, with the parts separated for clearance;

Fig. 4a is an enlarged reproduction of a portion of Fig. 4 illustrating the galvanometer pointer and coil structure;

Fig. 4b is a section on the line 4b—4b of Fig. 4a;

Fig. 5 is a front elevation of the galvanometer unit;

Fig. 6 is a rear elevation of the galvanometer unit; and

Fig. 7 is a perspective view of a molding forming an element of the galvanometer assembly.

In the embodiment and use of our invention illustrated in the drawings, the galvanometer forms a part of a potentiometer instrument disclosed in our prior application, Serial No. 546,290, filed June 23, 1931, of which the present application is a division. In said instrument, the bulk of the instrument mechanism is mounted on a frame or supporting arm 47, hinge connected at 52 to an instrument casing 24. The frame 47 and instrument mechanism are normally received in and enclosed by said casing, but when the front door of the casing is opened, the frame 47 may be swung on its hinges to move the instrument mechanism out of the casing and thereby make accessible the portions of the mechanism normally facing and adjacent the rear wall of the casing. In the said instrument, the galvanometer is mounted in a recess 54 formed in the frame 47, and open at its upper end and at its rear side, though in the normal operating condition of the instrument, the galvanometer is surrounded by the walls of an enclosure formed in part by the member 47, and in part by removable cover parts 124, 127, and 128, hereinafter described.

The galvanometer assembly includes a plate 56, detachably secured against the front vertical wall of the recess 54 and forming the member through which the galvanometer assembly is normally secured to the frame 47.

The plate 56 is provided with an aperture 57 through which a screw 55 extends to secure the plate 56 to the frame 47. Projections 58 are provided on that surface of the plate 56 adjacent the surface of the instrument frame and fit into recesses in the frame 47, so as properly to align plate 56 when secured in place. Plate 56 is provided with pins 59 which extend into recesses (not shown) in pole pieces 60 of the galvanometer horse shoe magnet 64, thereby properly positioning the pole pieces. The pole pieces 60 are provided with threaded recesses 61 into which bolts 62 are screwed, the bolts passing through apertures 63 in the magnet 64 and securing the magnet 64 to the pole pieces 60. A hook 65 extends over the magnet 64, and through an aperture 66 in plate 56, and the magnet 64 is clamped to the plate 56 by the nut 67 applied to the threaded end of the hook 65. Studs 68 extend through apertures 69 in plate 56 and are threaded into pole pieces 60 to secure the pole pieces to the plate 56, the pole pieces being provided with apertures 70 through which the ends of studs 68 extend.

The ends of studs 68 are arranged to pass through apertures 71 in a Bakelite molding 72. The studs 68 are provided with recesses 73, adapted to accommodate notches 74 in clamping bar 75. (See Figs. 4 and 6.) When the plate 56, pole pieces 60, magnet 64, and Bakelite molding 72 are in assembled relation, the bar 75, when turned into clamping position with respect to studs 68, secures the Bakelite molding to the magnet system. The bar 75 is mounted on the Bakelite molding 72 for rotation by bolt 76. The bolt 76 extends through passage 77 in core 78 adapted to fit within the galvanometer coil and provide a uniform electro-magnetic field in which the galvanometer coil may move. The Bakelite molding is provided with a projection 79 having a face 80 shaped to receive and support the core 78 and the body of the molding 72 is provided with aperture 81 through which the bolt 76 passes. Suitable securing means, such as washer and nut 82, are threaded on the end of the bolt 76 to secure the core 78 in place. The bolt 76 is provided with a recessed projection 83 over which the aperture 84 of the bar 75 fits and which accommodates a cotter 85 to secure the bar 75 into position on the end of the bolt 76.

The molding 72 has upper and lower extensions 86 provided with shoulders 87 and ways 88 respectively adapted to receive and guidably support upper and lower fittings 89 for motion longitudinally of the extensions 86. Each fitting 89 is provided with an offset 90 which contacts with and rides along the faces of the shoulders 87. The face or body portion 91 of each fitting 89, fits into the way 88 of the molding. The offset 90 of each fitting 89, cooperating with shoulders 87, and the corresponding face 91, cooperating with way 88, support the fitting 89 against lateral movement with respect to the corresponding extension 86. Each fitting 89 is provided with a lug 92 having a threaded aperture 93 into which is threaded a thumb screw 94. The shaft of the thumb screw 94 extends through a corresponding aperture 95 in the Bakelite molding 72. The end of each thumb screw 94 is provided with a recess into which fits a cotter 96 for securing the thumb screw against longitudinal movement with respect to the molding 72, and for limiting the movement of the corresponding fitting 89 along longitudinally of the corresponding thumb screw 94. Rotation of each thumb screw 94 shifts the corresponding fitting 89 longitudinally of the extension 86. Each fitting 89 is provided with a threaded aperture 97 to receive a screw 98 passing through a clip 99, having ears 100 which ride on the face 101 of the corresponding extension 86. The clips 99, when secured in place by the screws 98, afford additional support against lateral movement for the fittings 89.

Each clip 99 and screw 98 serve an additional function in that they form means used in connecting the galvanometer leads, or terminal conductors, 99' and 99'', to the galvanometer coil or winding, as shown in Figs. 2 and 6. As shown in Fig. 6, an electrical connection is made between each clip 99 and the galvanometer suspension by a corresponding conductor 102 secured to the clip 99 as by soldering, or any other suitable means, and secured to the corresponding spring 103, to which the corresponding galvanometer suspension part is connected, by a soldered or other suitable joint between the conductor 102 and a bent lug portion 104 of spring 103.

Each spring 103 is provided with an aperture 105 which fits over a projection 106 carried by arm 107 pivotally mounted as by means of pin 108 on the lug portion 109 of the corresponding fitting 89. Each spring 103 is secured in place upon the corresponding arm 107 by turning over the projection 106, or in any other suitable manner. The pivotal mounting of each arm 107 on the corresponding lug 109, provides for adjustment of the galvanometer suspension about its axis in order to properly position the galvanometer suspension with respect to the zero point as determined by the other parts of the instrument with which the galvanometer suspension is associated. In order that movement of each arm 107 about its pivot 108 may provide only rotational adjustment of the galvanometer suspension, each spring 103 is formed with an extension 110 to which a bushing 111 is secured in such position as to be in axial alignment with the pivots 108 when the spring 103 is secured to its arm 107 by projection 106 from the latter. Each bushing 111 may be secured to the corresponding spring 103 by welding or in any other suitable manner. Each bushing 111 receives a ferrule 112 which is secured thereto by means of screws passing through the bushing or in any suitable manner. A suspension wire or strip 113 is secured to each ferrule 112 as by soldering. A ferrule at the coil adjacent ends of two suspension wires 113 is secured to upper and lower bosses 114, fastened as by welding to sheet metal clips 115 which are bent around the top and bottom portions of the galvanometer coil 115a to rigidly connect the galvanometer coil and bosses. One of said clips 115, the upper one as shown, is provided with an integral projection having at its end an uprising edge 116. The same clip 115 is provided with a projection 117 extending in the opposite direction from the first mentioned projection, to which is secured, as by welding, a leaf spring 118 forming an extension of the pointer 119 of the galvanometer. The spring 118 is provided with aperture 120 through which boss 114 extends. The spring 118 is provided with a ridge or like edge forming surface 121 adapted to cross and rest upon the edge 116. The point of contact between edge 116 and ridge 121 affords a single point of bearing about which the pointer 119 may be moved slightly during the hereinafter mentioned operation of the mechanism for gauging the position of the galvanometer, thus providing a single point of support between the galvanometer pointer and edge 116, whereby wabbling of the pointer and distortion of the suspension system due to force acting on the pointer, is prevented, which is especially important because the gauging operation tends to set the pointer into vibration at the time of releasing the pointer. The contact between edges 116 and 121 damps the pointer oscillations and quickly brings the pointer to rest. The clip 115 to which the pointer 119 is secured, is provided with a threaded rod 121' projecting laterally of the coil in line with the pointer which carries the nut 122 threaded thereon for adjustment to balance the weight of the pointer 119.

As will be observed in Figs. 5 and 6, the parts shown in displaced relation in Fig. 4, when assembled, are so arranged that the galvanometer coil 115a extends about the core 78 and is situated between the poles 60 of the magnet, the whole system comprising the galvanometer suspension, core, magnet, and poles being clamped together by bolts 68 and cooperating parts. The molding 72, as shown in Fig. 7, is provided with four troughlike depressions 123, so positioned that when the movable system of the galvanometer is being assembled, the bosses 114 on the galvanometer coil supporting clips, rest in a pair of the recesses 123, and the ferrules 112 distant from the galvanometer coil rest in the other pair of recesses 123. Recesses 123 provide convenient supports for the parts mentioned to facilitate the assembling operation.

It is apparent from the foregoing description, by this invention there has been provided a markedly simplified form of galvanometer construction employing molded and stamped parts, which in molded and stamped form interfit to provide a complete assembly affording a maximum of adjustability together with marked simplicity of construction, affording facility of manufacture and assembly at a minimum cost. The galvanometer unit is so constructed that it can be assembled as an independent unit comprising those parts illustrated in Fig. 4, the single unit being shown in Figs. 5 and 6, which may be secured on the instrument frame in proper relation with the other parts of the instrument by a single screw 55 passing through the aperture 57 in plate 56. The unit is arranged for facility in inspection, dismantling, service and repair.

The recess 54 in the instrument frame or arm 47 on which the galvanometer unit is mounted, is provided with a rear cover 124 (see Figs. 1, 2, and 3), which is adapted to fit onto the walls of the recessed portion of the frame by spring action, and can be removed manually when the instrument frame is swung out of the casing, making the back of the frame available. A cap 127 (Figs. 1, 2, and 3) closes the top of the recess and rests upon the top edge 126 of the recess 54, closes the top of the recess space proper, and forms the top and side walls of an upper horizontal front extension of that space. The extension space 125 receives the galvanometer pointer 119 and cooperating pointer position gauging mechanism. A front cover part 128 forms the front of the cap 127 and is provided with a window through which the galvanometer pointer and the pointer gauging mechanism may be viewed.

As shown in Fig. 3, the cap 127 rotatably carries in apertures formed therein, a shaft 129 which extends through the front of the cover 128, its exposed end being provided with a kerf. Shaft 129 carries on its other end a gear 131 meshing with gear 132, the axle of which is journaled in the bushing 133 molded into the material of the cap. When the galvanometer unit is mounted in position upon the instrument frame, and when the cap and associated parts are mounted in position, the axle of gear 132 is in axial alignment with pivots 108 and the galvanometer suspension. The spring 103 carried upon the upper fitting 89 by an arm 107 rotatable about pivot 108, is provided with an upward extension 134 having a ridge 135 formed therein, which, as shown in Figs. 2 and 3, is adapted to extend between teeth of the gear 132, so that rotation of gear 132 by manually effected rotation of shaft 129, will transmit angular motion to the upper spring 103 and galvanometer suspension connected thereto, about the axis of the suspension. Such adjustment of the galvanometer suspension about its axis is provided to set the pointer to the zero position relative to the other parts of the instrument, when no current is flowing through the galvanometer. The construction of the zero adjusting means of the galvanometer is simple, trouble free, easy to make, conveniently arranged for operation on the instrument, and readily assembled and available for servicing.

The previously mentioned pointer position gauging mechanism, shown in part in Fig. 1, comprises parts co-acting periodically to clamp the galvanometer pointer 119 against deflection and acting through an arm 173, carried by a rod or shaft 174, to adjust the latter into an angular position depending upon the deflective position of the pointer 119 at the time. The construction and mode of operation of the gauging mechanism need not be further referred to herein as they form no part of the invention claimed herein, and are fully disclosed in our parent application Serial Number 546,290. It is to be noted, however, that the features of galvanometer construction and arrangement claimed herein are well adapted for the ready and effective association with the galvanometer, of a suitable gauging mechanism, and that the galvanometer pointer and the means for supporting the galvanometer coil, are well adapted to withstand the shock and vibration resulting from the clamping and release of the galvanometer pointer in the gauging operation. The portions of the member 47 adjacent the recess 54 and extension space 125, and the cover parts 124, 127 and 128, form a closed housing for the galvanometer unit and associated gauging mechanism unit, affording ready and complete access to those units together with protection from external influences.

While we have herein illustrated and described a preferred specific embodiment of the invention herein claimed, variation may be made in details of construction and arrangement of the embodiment illustrated without departing from the spirit and scope of the invention as defined in the following claims.

Having now described our invention, what we claim as new and desire to secure by Letters Patent is:

1. In a galvanometer of the d'Arsonval type, the combination with the galvanometer coil and suspension system, of a molding of insulating material, means for mounting the system on the molding including springs for tensioning the system and means for adjustment of the system relative to the molding in one direction, said first mentioned means and molding being relatively adjustable for adjustment of the system relative to the molding in a second direction.

2. In a galvanometer of the d'Arsonval type, the combination with a galvanometer coil and suspension system, of a molding of insulating material, and means for mounting the system on said molding including springs for tensioning said system and including means for adjustment of the angular position of the system relative to the molding, said first mentioned means and molding being relatively adjustable to vary the positions of said springs relative to said molding and relative to each other.

3. In a galvanometer, a movable galvanometer coil, a clip secured to said coil, a suspension element connected to said clip, a leaf spring extending from said clip in a lateral direction relative to the coil, a pointer secured to the leaf spring, and a supporting member on said clip and having an edge extending transversely to the direction of the plane of flexure of the leaf spring, said spring being provided with a narrow surface arranged to extend transversely of, and rest on, said edge.

4. In an instrument, a galvanometer coil and suspension, a molding, means adjustably supporting the suspension on the molding, a magnet, a plate, an instrument frame, means for removably uniting the plate, the magnet, and the molding into a unit, and means cooperating with said plate and frame for securing said unit to the frame.

THOMAS R. HARRISON.
ERNEST H. GRAUEL.
JOHN E. KESSLER.